L. W. MULFORD.
VAULT LIGHT CONSTRUCTION.
APPLICATION FILED SEPT. 3, 1912.
1,052,085.
Patented Feb. 4, 1913.
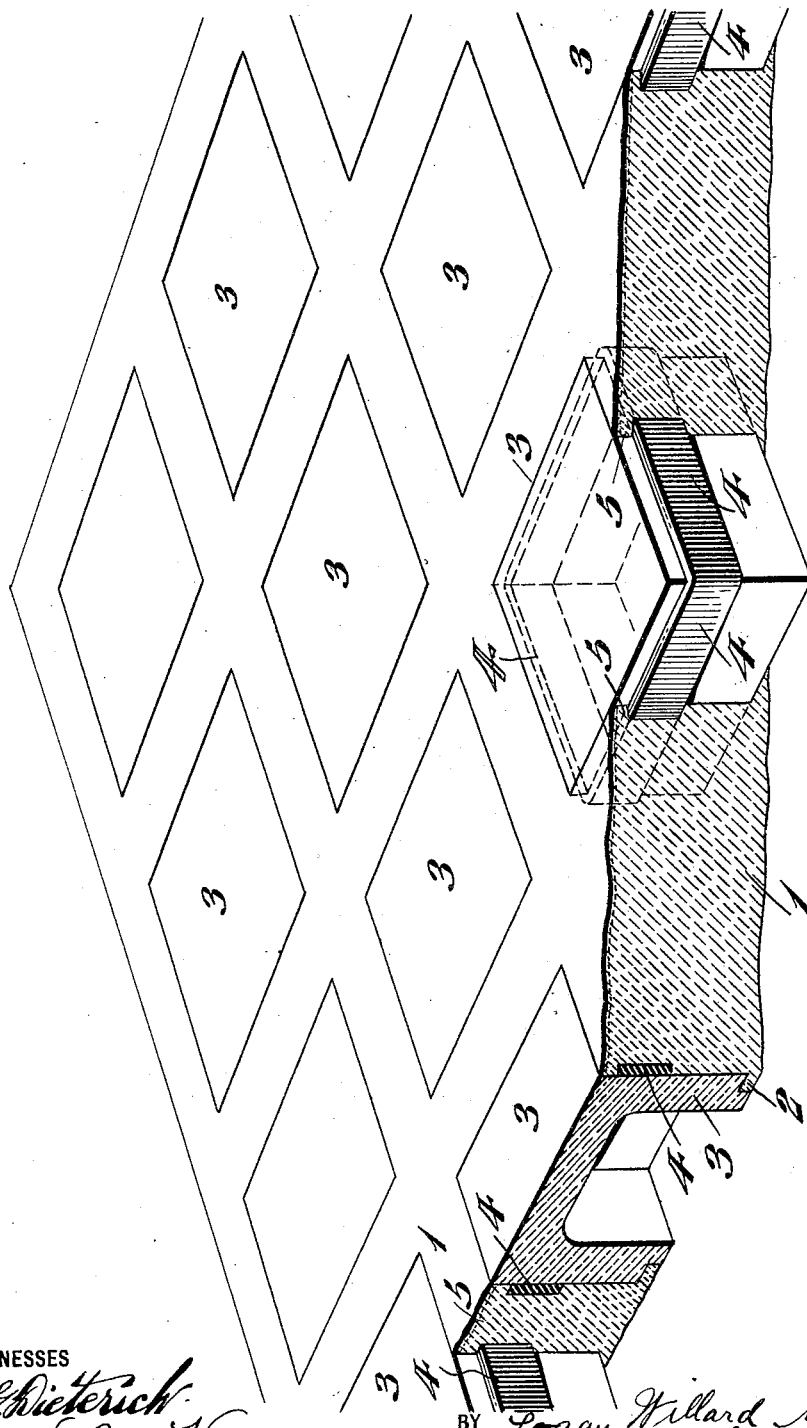
WITNESSES
INVENTOR
ATTORNEYS

UNITED STATES PATENT OFFICE.

LOGAN WILLARD MULFORD, OF PHILADELPHIA, PENNSYLVANIA, ASSIGNOR TO AMERICAN BAR LOCK COMPANY, OF PHILADELPHIA, PENNSYLVANIA, A CORPORATION OF PENNSYLVANIA.

VAULT-LIGHT CONSTRUCTION.

1,052,085. Specification of Letters Patent. Patented Feb. 4, 1913.

Application filed September 3, 1912. Serial No. 718,309.

*To all whom it may concern:*

Be it known that I, LOGAN WILLARD MULFORD, a citizen of the United States, residing in the city and county of Philadelphia, State of Pennsylvania, have invented a new and useful Vault-Light Construction, of which the following is a specification.

In concrete constructions such as vault lights, sky lights and floor or pavement lights, considerable trouble and expense has been heretofore caused owing to the breaking of the lenses or tiles due to the expansion and contraction of the lenses and the concrete, the lenses, as is well-known in the art, being ordinarily constructed of glass. In order to overcome the breaking of the glass lenses, due to the said expansion and contraction, it has been proposed to employ a band or strip of material placed between the lenses or tiles and the concrete, but extended flush with the top surface thereof, in order to serve as a cushioning medium therebetween, but since such material will not form with the glass lenses a liquid tight bond or seal, it has been found impracticable in practice by the above mentioned device to prevent the leakage of liquid around the glass and through the concrete construction. As is well-known to those skilled in this art, in order to render a vault light construction water-tight, it is necessary to finish the upper surface of the cement or concrete with a finishing coating which will render the construction impervious to liquid, but in cases in which a strip of cushioning material has been placed around the glass and extended flush with the top thereof, it has been found impossible to finish the upper face of such strip or coating in proximity to the lenses in such a manner that there will be no leakage around the lenses and through the construction.

It is the object of my present invention, to devise a novel concrete construction, in conjunction with which lenses are employed and wherein means are provided for compensating for the expansion of the glass lenses and the concrete or other binding material employed and at the same time provide for an efficient liquid seal being formed between the lenses and the concrete, so that there is no liability of any leakage of liquid through the construction.

With the above in view, my invention consists of a novel concrete construction, wherein provision is made for preventing the breaking of the glass lenses and for preventing the leakage of liquid through the construction in proximity to said lenses.

It further consists of a novel concrete construction wherein a strip of cushioning material is placed around the lenses so as to terminate at a point below the upper surface thereof so that the concrete or binding material may extend above and around the upper edge of said strip into contact with the glass at the upper surface thereof, so that the upper surface of the concrete which is substantially flush with the top surface of the glass, will conceal said cushioning strip, and said concrete may be rendered impervious to moisture or liquid over the entire surface of the construction.

It further consists of other novel features of construction, all as will be hereinafter fully set forth.

For the purpose of illustrating my invention, I have shown in the accompanying drawings a preferred embodiment which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

The accompanying drawing represents a perspective view of a concrete construction embodying my invention, the same being broken away to show in perspective elevation and section certain novel features of the construction.

Similar numerals of reference indicate corresponding parts in the figure.

Referring to the drawing:—it will be understood that my present invention is not limited to any special type of vault light construction or to any special construction of the lenses or tiles and the construction shown represents but one of many ways of carrying out my invention in practice.

1 designates the concrete, cement or other binding material employed, which in the present instance I have shown as being provided with flanges 2 adapted to receive lenses or tiles 3 of any desired construction and composed of glass or other material the same being shown in the present instance for purpose of illustration as having a rectangular contour.

4 designates a strip or band of material of any desired nature, such as, for example, paper, pasteboard, cardboard, rubber, or any other suitable material which surrounds the contiguous lens and is located at a point below the upper surface thereof. The cushioning device or strip or band 4 may, if desired, be any water-proofing compound, as coal-tar and pitch, which may or may not adhere to the glass and the concrete, or it may be composed of sulfur and coal-tar or of any other materials which will produce a satisfactory body.

When the concrete is placed in position the same completely incloses the strip 4 and extends over the top of the same into contact with the upper periphery of the lens 3, as is indicated at 5, and since the concrete extends above the upper edge of the cushioning strip 4, contiguous to the glass, and flush with the upper surface thereof, it will be apparent that when the top surface of the construction is rubbed down with any suitable material, in order to render the concrete impervious to moisture or liquid, that the construction is rendered water-proof over its entire surface, and the liability of leakage through the construction around the glass, which occurs in the prior devices is entirely eliminated.

The place where the lenses ordinarily break when located under present method of construction is at or in proximity to the upper edge thereof and in my invention the body of concrete as indicated at 5 in contact with the glass at the upper portion is not sufficient to cause the breaking of the lenses but is amply sufficient for the formation of a liquid seal at such point, as is evident.

I am aware that it has been heretofore proposed in the patent to Jacob #725,342 and the patent to Bradley #934,136 to employ a band to surround a lens but extending upwardly flush with the surface of the lens and concrete so as to form a part of the tread or outer surface of the construction, and to such a construction and the construction of the prior art I make no claim since my invention is clearly differentiated from the prior devices, by the fact that my cushioning strip of material 4 employed does not extend flush with the surface of the construction nor does it form a part of the tread or outer surface of the construction whereby I am enabled to render the same entirely waterproof in the manner herein set forth, which is not the case in the prior constructions, while at the same time preventing the fracturing of the lenses embedded in concrete, through pressure resulting from the unequal expansion and contraction of the cement and glass by heat, a strong and durable construction being thus produced, which is transparent over a considerable proportion of its extent, which is not affected by such changes in temperature as those to which structures exposed to the weather are commonly subjected.

It will now be apparent that I have devised a novel and useful vault light construction which embodies the features of advantage enumerated as desirable in the statement of the invention and the above description, and while I have, in the present instance, shown and described a preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a construction of the character described, a lens having a band of cushioning material surrounding it, the upper edge of said band terminating below the top surface of said lens and a concrete filling of cement surrounding said band and in contact with said lens, said concrete being extended above the upper edge of said cushioning band to a point substantially flush with the top of said lens.

2. In a construction of the character described, the combination of a concrete body, lenses embedded in said concrete body and carried thereby, a cushioning band 4 surrounding said lenses and interposed between said lenses and concrete, the upper edge of said band terminating below the top of said lenses, said concrete being extended at 5 to fill in the space between the top edges of said bands and the top surfaces of said lenses, whereby said cushioning bands are concealed and said concrete body is substantially flush with the tops of said lenses.

LOGAN WILLARD MULFORD.

Witnesses:
  E. HAYWARD FAIRBANKS,
  C. D. McVAY.

---

Copies of this patent may be obtained for five cents each, by addressing the "Commissioner of Patents, Washington, D. C."